Feb. 12, 1924.

M. ALPERN 1,483,706

FURNACE LINING

Filed Dec. 2, 1922

Inventor—
Maxwell Alpern.
by his Attorneys.
Howson & Howson

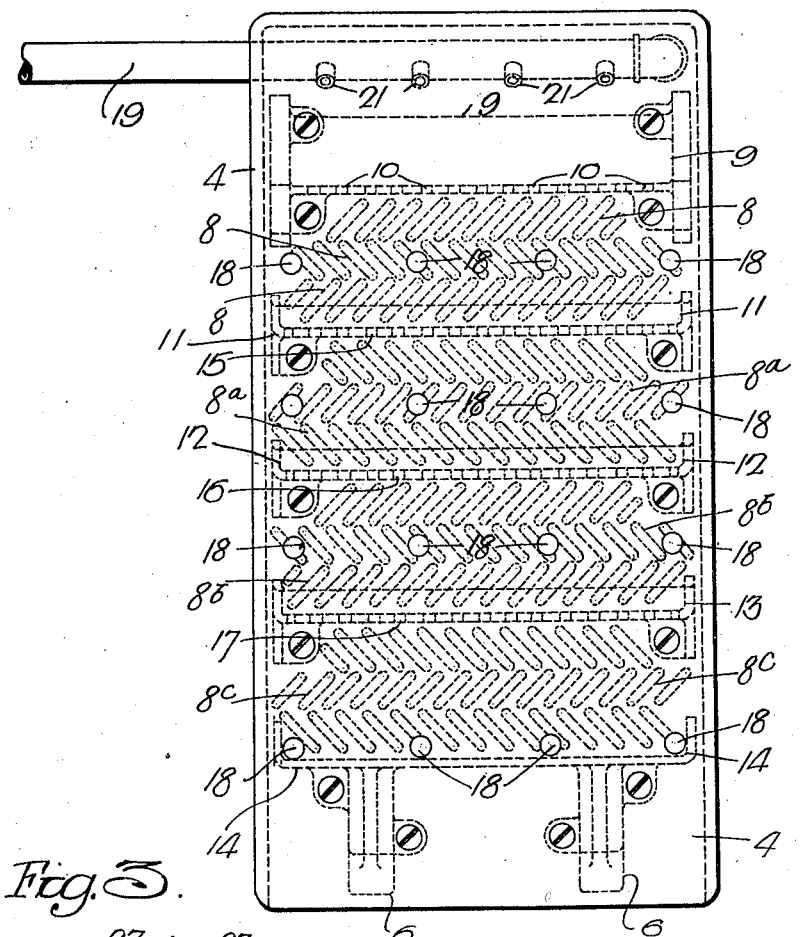
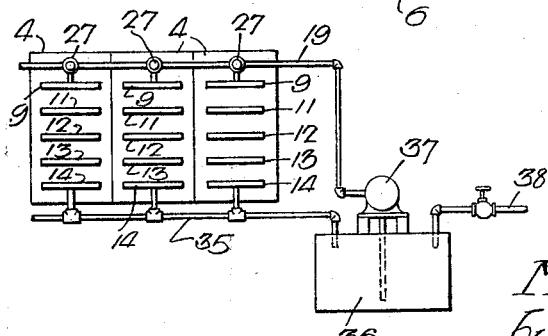

Patented Feb. 12, 1924.

1,483,706

UNITED STATES PATENT OFFICE.

MAXWELL ALPERN, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

FURNACE LINING.

Application filed December 2, 1922. Serial No. 604,494.

*To all whom it may concern:*

Be it known that I, MAXWELL ALPERN, a citizen of the United States, residing in Philadelphia, Pennsylvania, have invented Furnace Linings, of which the following is a specification.

One object of my invention is to provide novel means for cooling a heated structure such as metal or other form of furnace lining, which shall be effective, economical, certain in action and of such a nature as will utilize both the cooling action occurring when water is evaporated and also any steam formed by such evaporation.

It is further desired to provide novel means for controlling the amount of or rate at which, water is supplied or delivered to a surface or other structure to be cooled, the arrangement being such that the amount of such water supply shall be substantially proportional to and variable with the temperature of the structure.

Another object of my invention is to provide a novel furnace lining structure so formed as to expose a minimum surface to the heat of the furnace and a maximum surface to the action of a cooling agent, and the invention also contemplates a novel device for employing water and air for cooling purposes as well as also utilizing the steam generated by the evaporation of such water.

I also desire to provide a novel structure for utilizing relatively small quantities of water in cooling heated structures such as furnace linings, together with a novel thermostatic device whereby the rate at which the water is supplied will be substantially proportional to and variable with the temperature of surface to be cooled.

Another object of the invention is to provide a novel form of furnace lining including a plate or equivalent structure whose expansion shall thermostatically control the supply of cooling medium, such as water, for reducing the temperature of said plate with a view to preventing its destruction or injury.

Another object of my invention is to provide a novel system of apparatus having the characteristics above noted for independently cooling the various sections of a furnace lining or equivalent structure, which apparatus shall include means for cooling certain sections subjected to relatively high temperatures, to a greater degree than other sections exposed to lower temperatures, the invention contemplating novel means for insuring the circulation of unevaporated water and the delivery of water to replace that evaporated.

These objects and other advantageous ends I attain as hereinafter set forth, reference being had to the accompanying drawings, in which, Fig. 1 is a transverse vertical section of a plate constituting a portion of a furnace lining, showing my invention as applied thereto;

Fig. 2 is an elevation of the plate shown in Fig. 1; and

Fig. 3 is an elevation, to some extent diagrammatic, showing my invention as applied to the several sections of a furnace lining.

Figure 1:
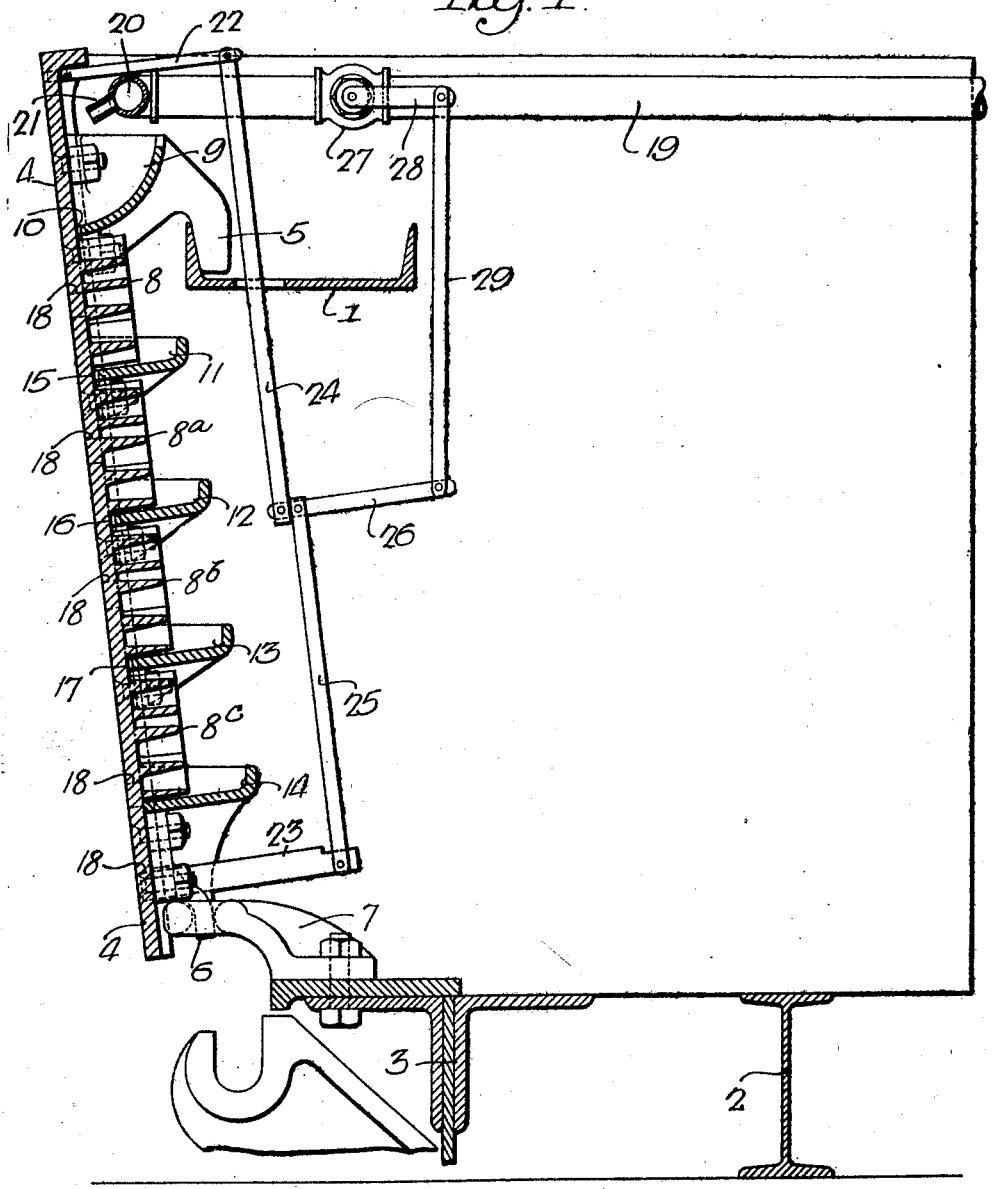

In Figs. 1 and 2 of the above drawings, 1, 2 and 3 represent certain beams forming part of the supporting framework of a furnace structure, one of whose lining plates 4 is shown as carried by the frame members 1 and 3. For this purpose the upper part of said plate has adjacent each of its sides two rearwardly projecting, downwardly directed members 5 extending into the frame member 1, which is shown as a channel section. At each side of the lower end of the plate two other downwardly projecting hook members 6 are provided to fit into suitable holes in the brackets 7 carried by the frame member 3.

The outer face of the lining plate 4, which is exposed to the heat of the furnace and to the action of the highly heated fuel and ash therein, is flat or plane, while the rear face of said plate in accordance with my invention, is provided with a number of series or groups of inclined fins or vanes 8, $8^a$, $8^b$ and $8^c$. The vanes or fins of each of these series are preferably arranged in a number of horizontally extending, substantially parallel lines or sets so as to form zig zag or tortuous passages, and these passages are supplied with a cooling medium such as water by means of a main trough 9 bolted or otherwise fixed to the rear face of the lining plate 4 at or adjacent the top thereof.

In the present instance this trough is shown as formed integrally with the supporting hooks 5, although this construction is not essential, and the bottom of said trough immediately above the uppermost line of vanes or fins 8 is perforated or provided with a series of outlet openings 10 through which water may be delivered in more or less small streams. This trough with its openings extends across the top of the lining plate, which is preferably extended further into the furnace than is its bottom portion so that the water delivered through the openings 10 tends to remain in contact with and flow down the rear face of said plate, although striking and flowing over the vanes of the several series to a greater or less extent.

In order to prevent the formation of more or less localized and unequal streams, I provide on the rear face of the plate 4 any desired or advisable number of auxiliary distributing troughs 11, 12, 13 and 14, of which the first collects the water which passes the vanes 8 of the uppermost series, and having a series of outlet perforations 15, redistributes said water uniformly to the second series of vanes 8$^a$. The trough 12 likewise collects the water after its passage by this second series of fins and having openings 16 in its bottom immediately adjacent the rear face of the plate 4, again uniformly redistributes the water to the next lower series of vanes 8$^b$. This distributing operation is again performed by the trough 13 from which the water escapes through openings 17 to the lowest series of fins or vanes 8$^c$, below which is the final collecting trough 14, shown in the present instance as integral with the supporting hooks 6. Holes or openings 18 are formed at intevals through the lining plate 4 to permit of the free passage of steam and air from the rear to the front face thereof.

For supplying cooling water to the plate 4 I provide a conduit 19 having a branch 20 extending immediately above the topmost trough 9 and preferably, though not necessarily, formed with a series of discharge nozzles 21 whereby water or other cooling fluid is delivered into said trough upon the rear face of the plate. It is to be understood that as indicated in Fig. 3 there are a number of the lining plates 4 all substantially similar in construction and all receiving water from the branch 20 of the conduit 19.

Under conditions of operation the smooth front face of each of the plates 4 is exposed to the heat of the furnace and to a greater or less extent to the action of burning fuel and highly heated ash, so that it becomes highly heated and would ordinarily be burnt, warped, or otherwise injured. If however water be supplied through the pipes 19 and 20, it passes into the trough 9, through the holes 10 of the latter onto the rear face of the plate, flowing in zig zag paths between the several baffles of the different series, between which it is repeatedly collected and redistributed so that the whole rear face of the plate is supplied. As a consequence, said plate is effectually cooled by reason of the heat absorbed in evaporating the films of water from the rear surface of the plate. At the same time the steam generated passes with more or less air through the openings 18 and exerts a cooling action on the ash which may be adjacent or in contact with the front face of said plate. The currents or jets of air and steam in passing through the openings 18 entrain small particles or bodies of water which, being evaporated on striking the hot clinker masses, will further lower the temperatures of the ash bed adjacent the front face of the plates. As a consequence, said ash is prevented from adhering to or burning away said plates and it is obvious that the quantity of water delivered through the pipe 19 may be accurately regulated to that found necessary to prevent injury to the plate; the usual amount being such a flow as will all or nearly all evaporate before reaching the lowest trough.

If desired I may provide means which are preferably automatic, for regulating the flow of water to the amount required to prevent injury of the parts and for this purpose I may for example rigidly fasten to two separated parts of each plate 4 a pair of arms 22 and 23, connecting these through a pair of links 24 and 25 to a lever arm 26, in such manner that the relative movement of the arms 23 and 24 toward and from each other will swing said lever arm 26. In the pipe 20 I place a controlling valve 27 for each plate and connect to its stem a lever arm 28, which through a link 29 is connected to the free end of the lever arm 26. The arrangement is such that when any plate 4 is at the normal or some other relatively low and safe temperature, the system of links and levers above described maintains the controlling arm 28 of the valve in such position that the latter is closed and water is thus prevented from flowing into the trough 9.

When however any plate 4 becomes heated and consequently expands by reason of the elevation of the temperature in the furnace, its arms 22 and 23 are bodily moved apart so that the free end of the lever arm 26 is swung downwardly. This through the link 29 so moves the lever arm 28 as to open the valve 27 and permit water to be delivered through the nozzles 21 to the trough 9 and hence to the plate 4. The parts may be so adjusted that the supply of water will increase as the temperature of the plate is increased and vice versa, so that each plate will be maintained at a substantially uniform safe temperature and no more water will be used than is required for this purpose.

Obviously the exact arrangement and mounting of the links and levers or other suitable device for attaining the above desired end may be widely varied without departing from this feature of my invention, which broadly contemplates the provision of automatic temperature-responsive mechanism for governing the supply of cooling medium in accordance with the temperature to which the furnace lining may be exposed. Obviously each plate or section of the lining has an independently controlled water supply so that the plate exposed to the highest temperature may have a maximum amount of cooling water delivered thereto. Any unevaporated water reaching the lowest troughs of the plates or lining sections is delivered through a pipe 35 to a make up tank 36, from which it may be delivered by a pump 37 to the supply pipe 19. Any water required to replace that evaporated is supplied to the tank 36 from a suitable source 38.

From the above description it will be appreciated that my invention utilizes not only the cooling action of water to reduce the temperature of heated structures such as the plates of a furnace lining, but also takes advantage of and employs the heat absorption occurring when water is evaporated, thus making possible the required temperature reduction with an amount of water many times less than that ordinarily employed and hitherto considered necessary for the purpose.

I claim:

1. The combination in a furnace lining of a plate; means for delivering cooling fluid to said plate; and thermostatic means including the plate itself for automatically governing the amount of fluid supplied.

2. The combination in a furnace lining of a structure to be cooled; a conduit connected to a source of cooling fluid and positioned to deliver the same to the rear face of said structure; with an automatic device governed by the expansion and contraction of the structure for controlling the flow of fluid to the conduit.

3. The combination in a furnace lining of a plate mounted in a position inclined to the vertical and having a rear heat dissipating face whose superficial area is greater than that of its front face; with means for supplying cooling liquid to the top portion of said plate.

4. The combination in a furnace lining of a plate having a rear heat-dissipating face whose superficial area is greater than that of its front face; with means for supplying cooling liquid to the top portion of said plate, said rear face including cooling vanes arranged to form zig zag channels for said cooling liquid.

5. The combination in a furnace lining of a perforated structure having a relatively smooth front surface exposed in the furnace and having a relatively extended rough rear surface; with means for supplying water in finely divided form to said rear surface.

6. The combination in a furnace lining of a plurality of sections; means for supplying water in finely divided form to the rear faces of said sections; and independent means for controlling the delivery of water to each of the sections.

7. The combination in a furnace lining of a plurality of sections each having a relatively smooth heated front face and a relatively extended rear face; means for delivering films of water to be evaporated on the rear faces of said sections; and means for independently controlling the supply of water to each section.

8. The combination in a furnace lining of a plurality of sections each having a relatively smooth heated front face and a relatively extended rear face; means for delivering films of water to be evaporated to the rear faces of said sections; means for independently controlling the supply of water to each section; with means for collecting and returning to the sections unevaporated water delivered therefrom.

9. The combination in a furnace lining of a plate having means for delivering water in finely divided form to the upper part of its rear face; a container for collecting unevaporated water reaching the lower part of said plate; and means for returning the water from said container to the upper part of the plate.

10. The combination in a furnace lining of a plurality of sections; a water supply conduit; and independent, thermostatically controlled valves connected to said conduit for independently regulating the quantity of water supplied to each section in accordance with the temperature to which it is exposed.

11. The combination of a furnace lining having an exposed rear face; and means for delivering to said face unconfined streams of water in such quantity as to be all substantially evaporated on the lining.

12. The combination of a furnace lining; with means for delivering water in finely divided form to the rear face of said lining in quantities such as will be substantially all evaporated by the heat imparted to said lining.

13. The combination of a furnace lining; means for delivering water in finely divided form to the rear face of said lining; and means for regulating the water flow to an amount which will be substantially all evaporated in flowing over said lining.

MAXWELL ALPERN.